May 20, 1952     W. H. KITTO     2,597,805
ELECTRIC TOASTER

Filed March 18, 1947     3 Sheets-Sheet 1

INVENTOR.
William H. Kitto
BY
Harry S. Dumarr
ATTORNEY.

May 20, 1952 W. H. KITTO 2,597,805
ELECTRIC TOASTER
Filed March 18, 1947 3 Sheets-Sheet 3

INVENTOR.
William H. Kitto
BY
Harry S. Ducasse
ATTORNEY.

Patented May 20, 1952

2,597,805

UNITED STATES PATENT OFFICE 2,597,805

ELECTRIC TOASTER

William H. Kitto, Chicago, Ill., assignor to The Hoover Company, North Canton, Ohio, a corporation of Ohio Application March 18, 1947, Serial No. 735,327

15 Claims. (Cl. 99—329)

The present invention relates to electric bread toasters and more particularly to a thermal timing mechanism for timing the duration of the toasting interval whereby the operator may obtain toast cooked exactly as he or she desires.

According to this invention the operator may manipulate a control so as to operate the toaster for toasting bread to a soft-light, soft-medium, or soft-dark degree or to a dry-light, dry-medium, or dry-dark degree.

Further according to this invention a thermal timer is provided for timing the duration of the toasting interval in which a thermally responsive element is alternately heated and cooled a plurality of times to operate a step by step mechanism to eventually deenergize the entire toaster and release the toast carriers for movement to toast ejecting position.

An auxiliary heater is provided for the thermally responsive element which is energized to heat the thermally responsive element and deenergized to permit the thermally responsive element to cool. During normal operation for making soft toast the main toaster heaters remain energized while the thermally responsive element is cooling. If dry toast is desired a control is manually manipulated whereby the main toaster heaters are energized and deenergized simultaneously with the auxiliary heater so that the bread merely dries out while the thermally responsive element is cooling.

Additionally, for making soft toast, the thermally responsive element comes into contact with a cooling block when the auxiliary heater is deenergized so that it quickly cools with the result that the cycle of heating and cooling the thermally responsive element follow each other in quick succession.

In making dry toast the control operates to prevent contact between the cooling block and the thermally responsive element during its cooling off periods so that the cooling off periods are correspondingly lengthened. This increases the time during which the bread is subjected solely to a drying operation due to the residual heat of the toaster.

According to the broadest aspects of this invention, the quick heating up and cooling off of the thermally responsive element eliminates the necessity of providing compensation for the timer as the toaster as a whole heats up with rapid repeated used. The thermal mass of the thermally responsive element with relation to its heating rate is so small relative to the thermal mass of the toaster as a whole with relation to its heating rate, that the rise in temperature of the toaster as a whole, with rapid succeeding toasting operations, that the number of times the timer has to operate before terminating a toasting operation varies little whether the toaster is hot or cold when a toasting operation is initiated.

This result comes about by reason of the fact that the timer is quickly heated whether the toaster is hot or cold. As the toaster as a whole heats up the timer also heats up. However, the timer is just as hot at its first change over from heating to cooling when the toaster is cold as it is for any other change-over regardless how fast succeeding toasting operations follow each other. Thus, since the timer is heated and cooled a plurality of times for each toasting operation, the only variable is the first heating up period of the timer whether the toaster is hot or cold. Therefore, the necessity for compensation is reduced, by an amount corresponding to the number of times the timer had to be heated up and cooled for each toasting operation. If properly designed, the number of operations of the timer will be the same whether the toaster is hot or cold at the initiation of any particular toasting operation.

Other objects and advantages of the invention will become apparent as the description proceeds when taken in connection with the accompanying drawings in which.

Figure 1:
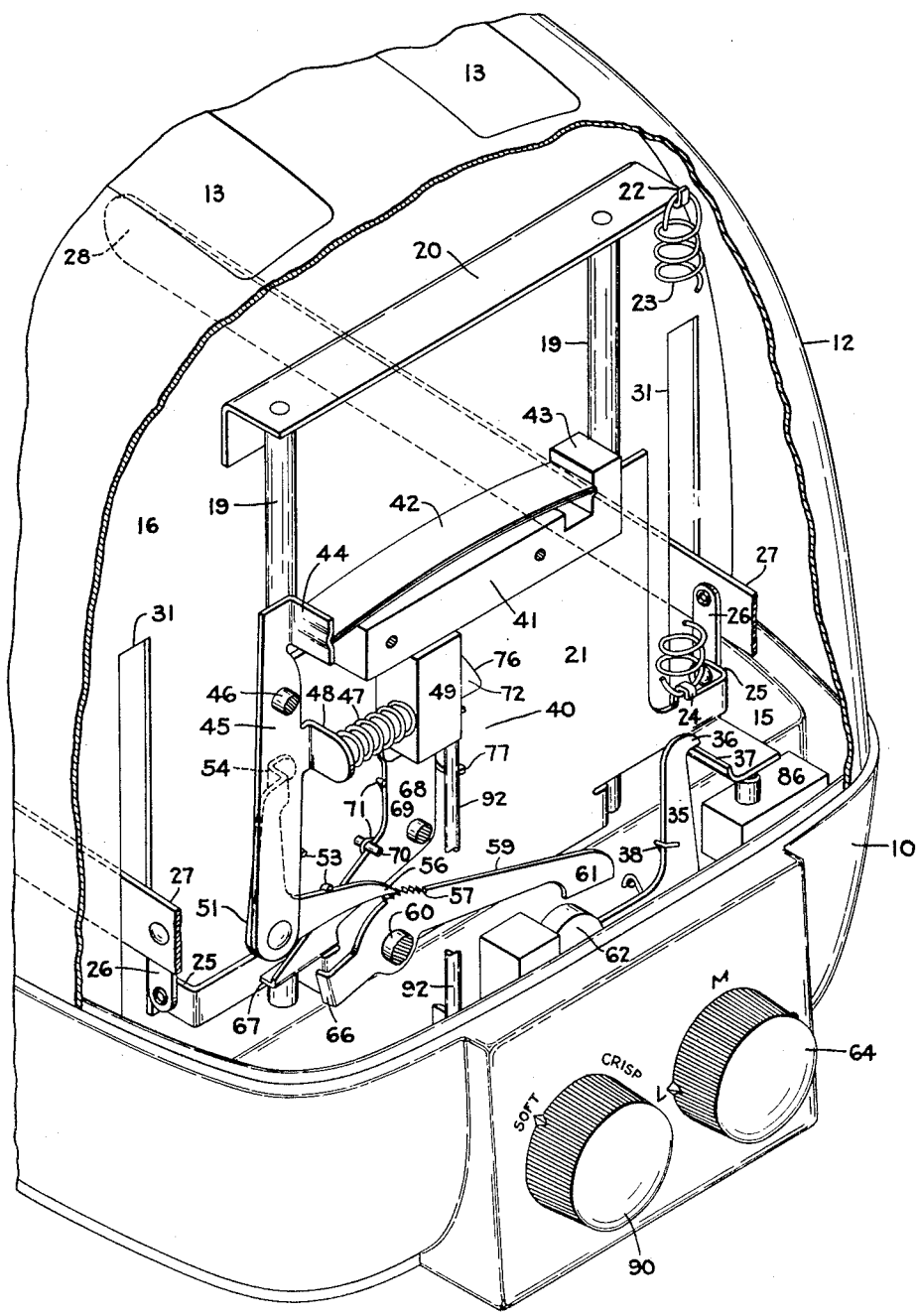
Figure 1 represents a perspective view of a toaster with this invention applied thereto, with the parts broken away and certain parts omitted to better show the details.

Referring to the drawings, a plastic base 10 is provided for supporting the entire toaster. Mounted on a shoulder 11 on the base 10 is an appearance housing 12 which houses the entire structure within the mechanism and toasting compartments.

A plurality of bread receiving openings 13 is provided in the appearance housing 12 through which the bread or toast will project when the bread carriers 14 are in ejecting position.

A base plate 15 is mounted within the base 10, and forms a support for the entire mechanism supported within the appearance housing 12.

A dividing plate 16 divides the space within the appearance housing 12 into a front mechanism compartment 17 and a toasting chamber or oven 18.

Extending upwardly from the base plate 15 are a plurality of posts 19 which form guides for the vertical movement of the bread carriers 14 and associated mechanism in a manner well known in the art. At their upper ends the posts 19 are rigidly secured to the dividing plate 16 by a bracket 20.

The bread carriers 14 are secured to a plate 21 which is guided for vertical movement by the posts 19. Extending forward from the bracket 20 is a hook 22 which forms the upper anchorage for a tension spring 23 secured at its lower end to hook 24 on the plate 21. The spring 23 normally biases the carriers 14 and plate 21 to their upward ejecting position.

Extending outwardly and rearwardly from the plate 21 are a pair of lugs 25. Pivoted to the rearwardly extending ends of lugs 25 are a pair of links 26 which in turn are pivoted at their upper ends to a pair of arms 27 forming a portion of the manually operated mechanism for moving the bread carriers 14 to toasting position.

The arms 27 extend through slots 31 in the dividing plate 16 and at their rear ends are pivoted at 28 to the side walls of the toast chamber 18. At their front ends the arms 27 are extended forwardly at 29 through a slot 30 in the front of the appearance housing 12. To the extended portions 29 of the arms 27 is secured a manipulating knob 32 by which the bread carriers 14 are moved in a straight line vertical movement while the arms 27 move in an arc.

The base plate 15 is depressed downwardly into U-shape as at 33 immediately below the mechanism compartment 17. Secured to the depressed portion 33 of the base plate 15 is an upward extending plate 34 (Fig. 3) which forms the support for the timing mechanism.

Pivoted to the plate 34 is a latch 35 having a hooked portion 36 which cooperates with a lug 37 extending forwardly from the bottom of the plate 21 to hold the plate 21 and bread carriers 14 in toasting position against the bias of spring 23. The latch 35 is spring-biased to latching position by spring 38.

Figure 2:
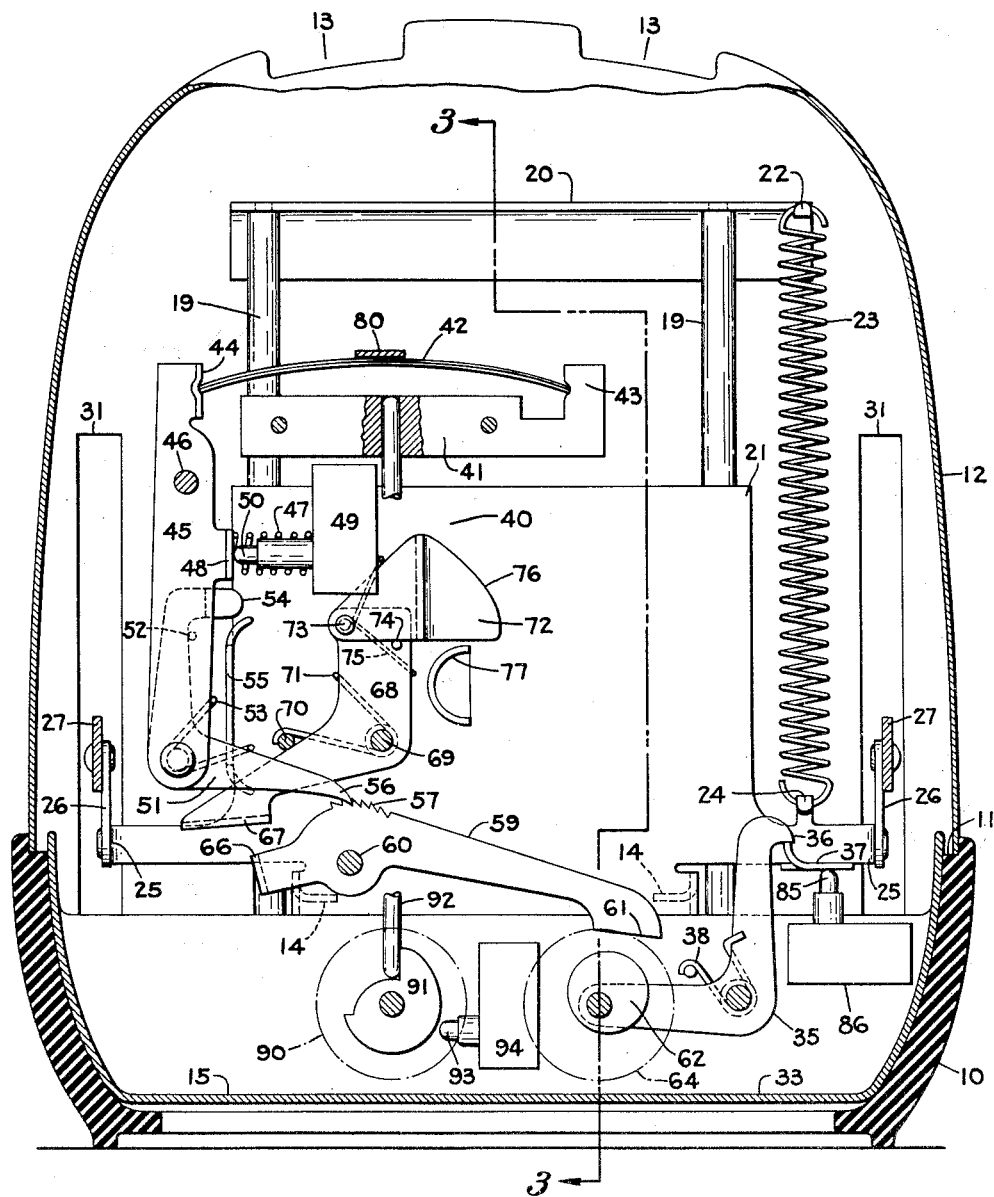
Figure 2 is a front cross-sectional view of the timing mechanism according to this invention.

A timing mechanism generally indicated by the reference numeral 40 is mounted on the plate 34. In Fig. 1 and Fig. 2 the plate 34 has been omitted to better show the operating parts of the timing mechanism.

The timing mechanism 40 comprises a cooling block 41 secured to the plate 34. The cooling block 41 may be made of aluminum or other metal having high heat dissipating properties. A snap-acting bimetal 42 is supported at one end by an upwardly extending lug 43 on the block 41 and at its opposite end by a lug 44 on a lever 45 pivoted at 46 to the plate 34. A spring 47 rests against a lug 48, below the pivot point 46 of lever 45 to apply a compressive force to the ends of the bimetal 42. The spring 47 abuts at its opposite end against the casing of a switch 49 and surrounds an actuating plunger 50, for the switch 49 for a purpose which will be described in more detail hereinafter. The switch 49 is a multiposition switch which closes one circuit when the plunger 50 is extended and another when the plunger 50 is pressed inwardly.

Pivoted to the lower end of lever 45 is a bell-crank lever 51 normally biased against a stop 52 by a spring 53. At its upper end the bell-crank lever 51 has an L-shaped portion 54 which cooperates with a lug or cam 55 extending forwardly from the carriage plate 21 for a purpose to be hereinafter described.

The bell-crank lever 51 also has a pointed end 56 which engages ratchet teeth 57 on a lever 59 pivoted to the plate 34 at 60. As will be more fully explained hereinafter the pointed end 56 engages the teeth 57 in a step by step fashion so that the end 61 of lever 59 will eventually engage the cam 62 on the end of latch 35 so as to move the latch 35 in a counter-clockwise direction and disengage the hook 36 from above the lug 37 and permit the bread carriers 14 to move to ejecting position under the bias of spring 23.

The cam 62 is connected by a shaft 63 to a knob 64 on the outside of base 10 so as to lengthen or shorten the number of steps the lever 59 has to move in order to release the latch 35.

A slot 65 is provided in the base 10 so that the knob 64 can be manually depressed and release the latch 35 independently of the timing mechanism.

A lug 66 on the lever 59 opposite the end 61 is adapted to be engaged by a lug 67 on bell-crank lever 68 to move the lever 59 to its original position each time the carriage 24 is moved to toasting position. For this purpose the bell-crank lever 68 is pivoted at 69 to plate 34 and is spring-biased against a stop 70 by spring 71. At its upper end the bell-crank lever 68 is provided with a cam link 72, pivoted thereto at 73 and spring-biased against stop 74 by spring 75.

The cam link 72 has a cam surface 76 which cooperates with lug 77 rigid with carriage plate 21 to move the bell-crank 68 counter-clockwise each time the carriage plate 21 is moved downwardly so as to engage the lugs 67, 66 and move lever 59 counter-clockwise to its original position. When the carriage 21 moves upwardly the lug 77 merely pivots the cam lever 72 counter-clockwise relative to bell-crank lever 68 against the bias of spring 75 to permit the lug 77 to move upwardly.

In its cold position the bimetal 42 rests against a stop 80 struck rearwardly from upper portion 81 of plate 34 secured to the cooling block 41. Mounted above the bimetal 42 is an auxiliary heater 82. A reflector 83 mounted on plate 81 is adapted to direct heat from the auxiliary heater 82 to the bimetal 42.

Mounted within the toasting chamber or oven 18 on opposite sides of the toast carriers are main heaters 84 which are energized when the carriage plate 21 is moved downwardly by the lug 37 contacting the operating pin 85 of main switch 86. The switch 86 opens automatically when pressure is released from the pin 85.

The operation of the structure so far described is as follows:

The operator adjusts the knob 64 for light, medium or dark toast which moves the cam 62 so that it will take a greater or less number of steps of the lever 59 to bring the lug 61 into contact with the cam 62.

The operator then inserts bread slices through the openings 13 in the appearance housing 12 so that they rest on carriers 14.

The handle 32 is then grasped and moved to lowered position. During this movement the lug 55 on carriage plate 21 will engage end 54 of bell-crank lever 51 to move the bell-crank lever 51 counter-clockwise as viewed in Figure 2 so as to raise its pointed end 56 free of the serrations 57 on the lever 59. The lug 77 on the carriage plate 21 will then engage the cam surface 76 of link 72 and move the bell-crank 68 counter-clockwise so as to engage the lugs 67 and 66 and move the lever 59 counter-clockwise and raise the end 61 of lever 59 to its original position free of cam 62 on latch 35.

When the carriage plate 21 reaches its lowermost position the hooked end 36 of latch 35 will engage over the top of the lug 37 and latch the carriage plate 21 and carriers 14 in toasting position. Also the lug 37 will engage the plunger 85 and close switch 86. The lug 55 will also move clear of the end 54 of bell-crank 51 so as to allow the spring 53 to move the bell-crank 51 clockwise and engage its pointed end 56 with one of the serrations 57 on arm 59. The lug 77 will also have cleared the link 72 and will lie below it as shown in Fig. 2.

Figures 3, 4:
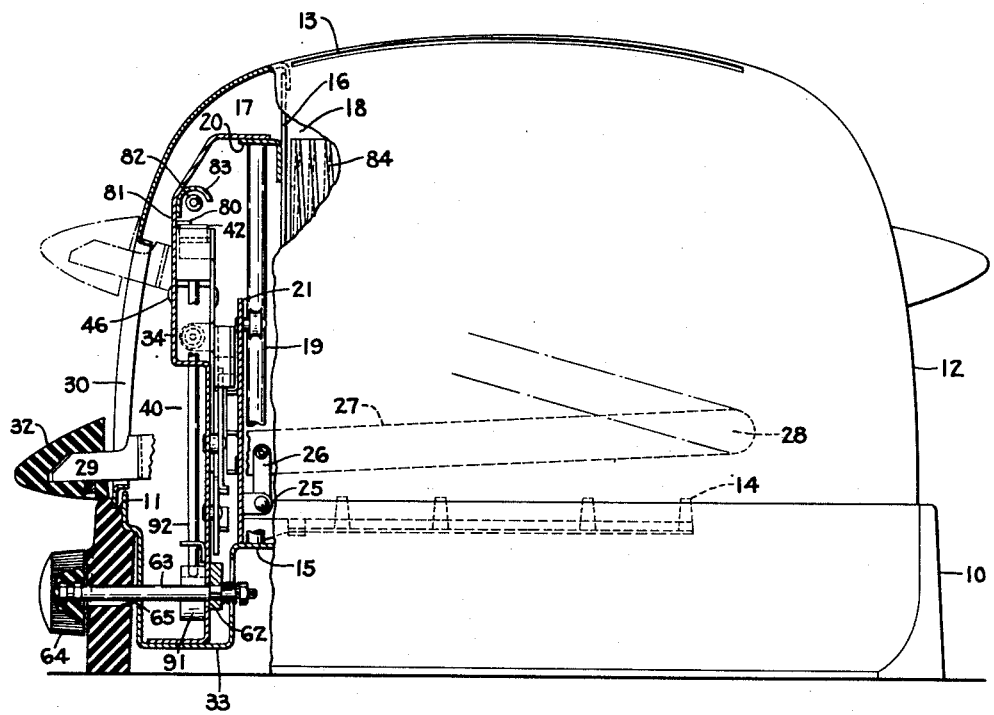
Figure 3 is a cross-sectional view taken on line 3—3 of Figure 2.
Figure 4 is a wiring diagram showing how the parts are electrically connected.

The switch 49 is such that it is in the full line position of Fig. 4 when the plunger 50 is in extended position and is in the dotted line position of Fig. 4 when the plunger 50 is moved inwardly. Thus when the switch 86 is closed by movement of the carriage plate 21 to toasting position the auxiliary heater 82 and the main heaters 84 will be simultaneously energized and the toasting period will begin.

Heat radiated directly from the auxiliary heater 82 and reflected thereto by reflector 83 will cause the bimetal 42 to slowly move downwardly until it passes its dead center position when it will snap downwardly against the cooling block in a position slightly below its dead center position. This will cause the lever 45 to move counter-clockwise so that the point 56 of bell-crank lever 51 will move the arm 59 clockwise one step. At the same time the lug 48 will move the plunger 50 inwardly to move switch 49 to the dotted line position of Figure 4 and deenergize the auxiliary heater 82.

This position of the switch 49 is shown in dotted line position in Figure 4 and it will be noted that the main heaters 84 remain energized and the full toasting effect will continue. The bimetal 42 will be quickly cooled by the heat dissipating properties of cooling block 41 and will move upwardly past its dead center position against the stop 80. This movement will also cause lever 45 to be moved clockwise under the action of spring 47 and move the pointed end 56 into the next serration 57 to the left of that it previously engaged as viewed in Fig. 2. At the same time the switch 49 will be moved to the full line position of Fig. 4 and the auxiliary heater 82 reenergized.

The above action will continue until the end 61 of lever 59 contacts the cam 62 on the latch 35 and the latch 35 will be moved counter-clockwise to remove the hook 36 from above the lug 37 whereby the carriage plate 21 and carriers 14 will be moved to ejecting position under the bias of spring 23. The switch 86 will be opened and the entire toaster will be deenergized.

If for any reason it is desired to terminate the toasting operation prior to the normal toasting interval or to inspect the toast the knob 64 may be moved downwardly to release the latch 35.

If crisp or "Melba" toast is desired the knob 90 (Fig. 1) is rotated clockwise from the "soft" position to the "crisp" position. This will cause the double cam 91 (Fig. 2) to be rotated clockwise so as to raise the plunger 92, which extends through an opening in the cooling block 41, so that its upper end will extend slightly above the upper surface of the cooling block. At the same time the outer surface of cam 91 will move the plunger 93 of switch 94 inwardly. The switch 94 is a two-position switch, which when the plunger 93 is extended is closed as in the full line position of Fig. 4 and when the plunger 93 is pressed inwardly is open as in the dotted line position of Fig. 4.

The operator then inserts bread as before and moves the manipulating handle 32 downwardly. The operation of the mechanism will be the same as for soft toast except that when the bimetal 42 snaps downwardly due to the heat of the auxiliary heater 82 it will be prevented from contacting the cooling block 41 by the upper end of plunger 92 and the main heaters 84 will be deenergized simultaneously with the auxiliary heater 82.

This will produce a multiple effect upon the drying action of the toaster. First, the toasting period will be prolonged due to the fact that the bimetal 42 will not cool so quickly because it is prevented from contacting the cooling block 41. Second, since the main heaters 84 are also deenergized while the bimetal 42 is cooling the bread will be dried by the residual heat of the toaster while no actual browning effect is taking place.

Eventually, as before, the heating and cooling of the bimetal 42 will advance the lever 59 step by step until its end 61 contacts the cam 62 to release the latch 35 and terminate the toasting period.

In making "Melba" toast the bread is browned during the period the main heaters 84 are energized and the drying action takes place while the bimetal 42 is cooling and the main heaters 84 are deenergized.

Obviously, for "Melba" or dry toast the browning control may be manipulated so that the operator can obtain crisp toast of a dark, medium or light shade and for soft toast he may obtain a dark, medium or light shade.

While I have shown but a single embodiment of my invention it is to be understood that this embodiment is to be taken as illustrative only and not in a limiting sense. I do not wish to be limited to the particular structure shown and described but to include all equivalent variations thereof except as limited by the scope of the claims.

I claim:

1. A toaster comprising, bread carriers movable from a bread receiving to a toasting position, main heating means for performing the toasting function, a thermally responsive element movable from a cold position to a hot position when heated and back to its cold position when cooled, auxiliary heating means for said thermally responsive element, means actuated by movement of said carriers to toasting position for simultaneously energizing said main and auxiliary heating means, means responsive to a plurality of movements of said thermally responsive element from its cold position to its hot position for terminating the toasting interval and a manually actuatable crisper control operable when in one position to deenergize both of said heating means when said thermally responsive element moves to its hot position and operable when in another position to deenergize only said auxiliary heating means when said thermally responsive element moves to its hot position.

2. A toaster as recited in claim 1 further provided with means for varying the cooling period of said thermally responsive element.

3. A toaster as recited in claim 1 further provided with cooling means for said thermally responsive element when it is in its hot position and means for rendering said cooling means ineffective when said crisper control is set to deenergize both said main and auxiliary heating means.

4. A toaster comprising bread carriers movable from a bread receiving to a toasting position, main heating means for performing the toasting function, a thermally responsive element movable from a cold position to a hot position when heated and back to its cold position when cooled, auxiliary heating means for said thermally responsive element, first switch means actuated by movement of said carriers to toasting position for simultaneously energizing both of said heating means in series circuit, second switch means actuated by movement of said thermally responsive element from its cold position to its hot position for cutting said auxiliary heating means out of circuit and closing a second circuit including said main heating means and manually operable means for selectively opening said second circuit whereby said main heating means will be deenergized simultaneously with the deenergization of said auxiliary heating means.

5. A toaster as recited in claim 4 further provided with means responsive to a plurality of movements of said thermally responsive element from cold position to hot position for terminating the toasting interval.

6. A toaster as recited in claim 4 further provided with means for cooling said thermally responsive element when it is in its hot position and means actuated by said manually operable means for rendering said cooling means ineffective.

7. A toaster comprising bread carriers movable from a bread receiving to a toasting position, means operable by movement of said carriers to toasting position for initiating a toasting operation, a browning control for controlling the duration of the toasting operation, said browning control including a thermally responsive element movable from a cold position to a hot position when heated and back to its cold position when cooled, heating means for said thermally responsive element, cooling means for said thermally responsive element, means operable by movement of said carriers to toasting position for energizing said heating means, means operable by movement of said thermally responsive element from its cold position to its hot position for operating a timing control, for simultaneously deenergizing said heating means and for initiating operation of said cooling means for said thermally responsive element and a crisping control superimposed upon said browning control, said crisping control including means for preventing initiation of the operation of said cooling means upon movement of said thermally responsive element to its hot position.

8. A toaster according to claim 7 in which a plurality of movements of said thermally responsive element from its cold position to its hot position are required to terminate the toasting operation.

9. A toaster according to claim 7 in which the main heating means is simultaneously energized with the heating means for the thermally responsive element, the browning control cuts the heating means for the thermally responsive element out of circuit upon movement of said thermally responsive element to its hot position, the crisping control causes simultaneous deenergization of both of said heating means and a plurality of movements of said thermally responsive element from its cold to its hot position is required to terminate the toasting operation.

10. A toaster comprising, main heating means for performing the toasting function, bread carriers movable from a receiving position to a toasting position adjacent said main heaters, a thermal timer for timing the duration of toasting intervals, an auxiliary heater for said timer, means for latching said carriers in toasting position, switch means for simultaneously energizing said heaters upon movement of said carriers to toasting position, said timer being movable from a cold position to a hot position upon being heated and back to its cold position upon cooling and operable after a plurality of oscillations to release said latch means and open said switch means, color control means for deenergizing said auxiliary heater when said timer moves to its hot position while said main heaters remain energized and to reenergize said auxiliary heater when said timer returns to its cold position, and manually actuatable crisper control means operable to deenergize both of said heating means when said timer moves to its hot position and to reenergize them when said timer returns to its cold position.

11. A toaster according to claim 10 in which said manually actuatable crisper control means is also operable to prolong the cooling off period of said timer so as to increase the duration of said toasting intervals during crisping operations.

12. A toaster according to claim 10 including means for cooling said timer when it moves to its hot position and said crisper control means being operable to reduce the cooling effect of said cooling means.

13. A toaster according to claim 12 in which said crisper control means reduces the heating effect of said main heaters during the cooling off periods of said timer.

14. A toaster comprising, main heaters for performing the toasting function, bread carriers movable from a receiving position to a toasting position adjacent said main heaters, a thermal timer for timing the duration of toasting intervals, an auxiliary heater for said timer, means for latching said carriers in toasting position, switch means for simultaneously energizing said heaters upon movement of said carriers to toasting position, said timer being movable from a cold position to a hot position upon being heated and back to its cold position upon cooling and operable after a plurality of oscillations to release said latch means and open said switch means, color control means for deenergizing said auxiliary heater when said timer moves to its hot position while said main heaters remain energized and to reenergize said auxiliary heater when said timer returns to its cold position, and manually actuatable crisper control means superimposed upon said color control means operable to increase the cooling off period of said timer to lengthen the duration of the toasting intervals and to decrease the heating effect produced by said main heaters per unit of time during the toasting intervals.

15. A toaster comprising a bread carrier movable from bread receiving to toasting position, means actuated by movement of said carrier to toasting position for initiating a toasting operation, a thermally responsive element movable from a cold position to a hot position as it is heated and back to its cold position when it is cooled, means for heating said thermally responsive element means actuated by movement of said carrier to toasting position for energizing said heating means, switch means for deenergizing said heating means as said thermally responsive element approaches its hot position, a cooling block positioned to be contacted by said thermally responsive element when it moves to its hot position to cause said thermally responsive element to be cooled and return to its cold position, said switch means being operable to reenergize said heating means as said thermally reponsive element returns to its cold position to cause said thermally responsive element to repeatedly move from its cold position to its hot position and back to its cold position, means responsive to a plurality of movements of said thermally responsive element from its cold position to its hot position for terminating the toasting operation, a stop movable into the path of movement of said thermally responsive element, and a manually actuatable crisper control selectively operable to position said stop in the path of movement of said thermally responsive element to prevent it from coming into contact with said cooling block when said thermally responsive element moves to its hot position to lengthen the cooling off period of said thermally responsive element and thus prolong the duration of the toasting interval.

WILLIAM H. KITTO.

REFERENCES CITED

The following references are of record in the file of this patent:

UNITED STATES PATENTS

| Number | Name | Date |
| --- | --- | --- |
| 2,120,289 | McCullough | June 14, 1938 |
| 2,132,622 | Ireland | Oct. 11, 1938 |
| 2,303,561 | Koci | Dec. 1, 1942 |
| 2,325,551 | Scharf | July 27, 1943 |
| 2,337,124 | Olving | Dec. 21, 1943 |
| 2,356,649 | Bucker | Aug. 23, 1944 |
| 2,364,175 | Turner | Dec. 5, 1944 |
| 2,365,909 | Sardeson | Dec. 26, 1944 |
| 2,388,641 | Myers | Nov. 6, 1945 |
| 2,414,325 | Newell | Jan. 14, 1947 |
| 2,422,199 | Koci | June 17, 1947 |
| 2,436,735 | Walder et al. | Feb. 24, 1948 |